United States Patent [19]

Parr et al.

[11] Patent Number: 5,069,472

[45] Date of Patent: Dec. 3, 1991

[54] ELECTRONICALLY CONTROLLED FLUID RELEASE FIFTH WHEEL SAFETY MECHANISM

[75] Inventors: Timothy J. Parr, Allegan; Gerald W. Hungerink, Holland, both of Mich.

[73] Assignee: Holland Hitch Company, Holland, Mich.

[21] Appl. No.: 560,131

[22] Filed: Jul. 31, 1990

[51] Int. Cl.$^5$ .................. B62D 53/06; B60T 7/12
[52] U.S. Cl. ...................... 280/433; 280/432
[58] Field of Search ............ 280/432, 433, 434, 435, 280/437, 438.1, 427, 428, 421

[56] References Cited

U.S. PATENT DOCUMENTS

| 2,623,753 | 12/1952 | Madigan | 280/434 X |
|---|---|---|---|
| 2,850,292 | 9/1958 | Holland | 280/434 |
| 2,982,566 | 5/1961 | Geerds | 280/435 |
| 2,998,267 | 8/1961 | Zajac et al. | 280/427 |
| 3,052,487 | 9/1962 | Harbers et al. | 280/506 |
| 3,117,803 | 1/1964 | Saewert | 280/433 |
| 3,165,335 | 1/1965 | Methven | 280/421 |
| 3,181,887 | 5/1965 | Boylan et al. | 280/421 |
| 3,181,888 | 5/1965 | Boylan et al. | 280/421 |
| 3,198,549 | 8/1965 | Martin | 280/432 |
| 3,391,950 | 7/1968 | Carter et al. | 280/421 |
| 3,628,811 | 12/1971 | Rivers | 280/421 |
| 3,640,549 | 2/1972 | Neff et al. | 280/435 |
| 3,653,686 | 4/1972 | Roesies | 280/421 |
| 3,941,408 | 3/1976 | Petersson | 280/421 |
| 4,428,595 | 1/1984 | Martin et al. | 280/435 |
| 4,573,699 | 3/1986 | Smith | 280/432 |
| 4,907,815 | 3/1990 | Hunger | 280/433 X |

FOREIGN PATENT DOCUMENTS

| 3803931 | 8/1989 | Fed. Rep. of Germany | 280/433 |
| 846053 | 8/1960 | United Kingdom | 280/427 |

OTHER PUBLICATIONS

"Remote Control of Fifth Wheel Coupling", by Dieter Raab, (1990 issue of Truck Technology International Ninety).

Primary Examiner—Charles A. Marmor
Assistant Examiner—Kevin Hurley
Attorney, Agent, or Firm—Price, Heneveld, Cooper, DeWitt & Litton

[57] ABSTRACT

A controlled fluid release fifth wheel apparatus having a first control in the tractor cab and a second control outside the cab, in series with each other, and functionally located in series between a power source and a power actuator at the fifth wheel hitch. Both the inside and outside controls must be properly actuated in series for the power actuator to operate to release the hitch. A timer is actuated by the first control to set a short time period during which the second control can be actuated. A trailer brake line air pressure sensor in series with the first and second controls prevents operation of the actuator until the trailer brake line is unpressurized such that the brakes on the trailer are locked.

12 Claims, 3 Drawing Sheets

ELECTRONICALLY CONTROLLED FLUID RELEASE FIFTH WHEEL SAFETY MECHANISM

BACKGROUND OF THE INVENTION

This invention relates to power actuated fifth wheel hitches, and more particularly to series actuator controls in series inside and outside the tractor cab for power actuation of the hitch.

Highway type semi tractor and trailer combinations predominantly use fifth wheel hitches for coupling. Receipt and coupling by the fifth wheel hitch of the kingpin occurs automatically when the two are in proper alignment. Release of the hitch from the kingpin is achieved by manually pulling a release rod under the trailer, the rod compressing the actuator spring and allowing one or both hitch jaws to retract. This release rod projects from the centrally located hitch toward the side of the trailer, but normally terminates short of alignment with the wheels in order to prevent damage to the release rod from objects traveling around the tires or from a retread which may tear loose from the spinning tires. Although reaching under the trailer and applying a powerful pull on the release rod has not always been too much of a problem with typical large male drivers, recent legal changes in the trailer width allowed and in the type of drivers entering the field are causing the manual release to be a problem. More specifically, trailers in many areas can now be legally as wide as 102 inches rather than the 96 inch previous standard. Consequently, the manual release rod is a considerably larger distance beneath the wider trailers, i e , spaced from the side of the trailer body. Also, there are more women drivers and more drivers of smaller stature and shorter arms such as those of Asian extraction. Consequently, the driver has more difficulty reaching far enough under the trailer to grasp the handle of the release rod, and even greater difficulty pulling it hard enough to release the hitch. In some trailer arrangements, there is no room for reaching in to grasp the handle of the release rod.

Conceivably, the release could be power actuated. Power actuated fifth wheel hitch releases have been used heretofore on truck tractors limited to yard work, i.e., moving trailers in the storage yard. These typically employ a fluid cylinder to release the jaws. A control actuator in the cab, e.g., a push button or switch, is simply pressed or shifted to actuate the fluid cylinder and release the hitch. As far as is known, however, such power actuators for release have not been employed on highway tractors. Accidental actuation of the fluid cylinder as by bumping the switch, or absent-mindedly pushing the switch, or the like, causing hitch release while traveling high speed highways or busy streets, could be disastrous.

SUMMARY OF THE INVENTION

An object of this invention is to provide a safe, power actuated release mechanism for fifth wheel tractor trailer hitches. Purposeful release is achieved readily, yet accidental release by inadvertent or unknowing operation of the actuator control is prevented. The power actuator is connected to a power source in series with a first interior control inside the tractor cab and a second exterior control outside the tractor cab accessible only by the driver standing outside of the cab. The first, interior control actuates a timer which enables the second exterior control to be actuated in series with the first control only during a predetermined short interval of time.

Preferably, when both controls have been properly activated, still the power actuated release is operable only if the brake line to the trailer is not pressurized, i.e., the trailer brakes are locked on.

The hitch can be properly released regardless of the size, sex and strength of the driver, yet not accidentally released to become a safety problem. A manual release rod is maintained for override of the powered system, as necessary.

These and other objects, advantages and features of the invention will be apparent from a study of the specification in conjunction with the drawings.

DESCRIPTION OF THE PREFERRED EMBODIMENT

Figure 1:
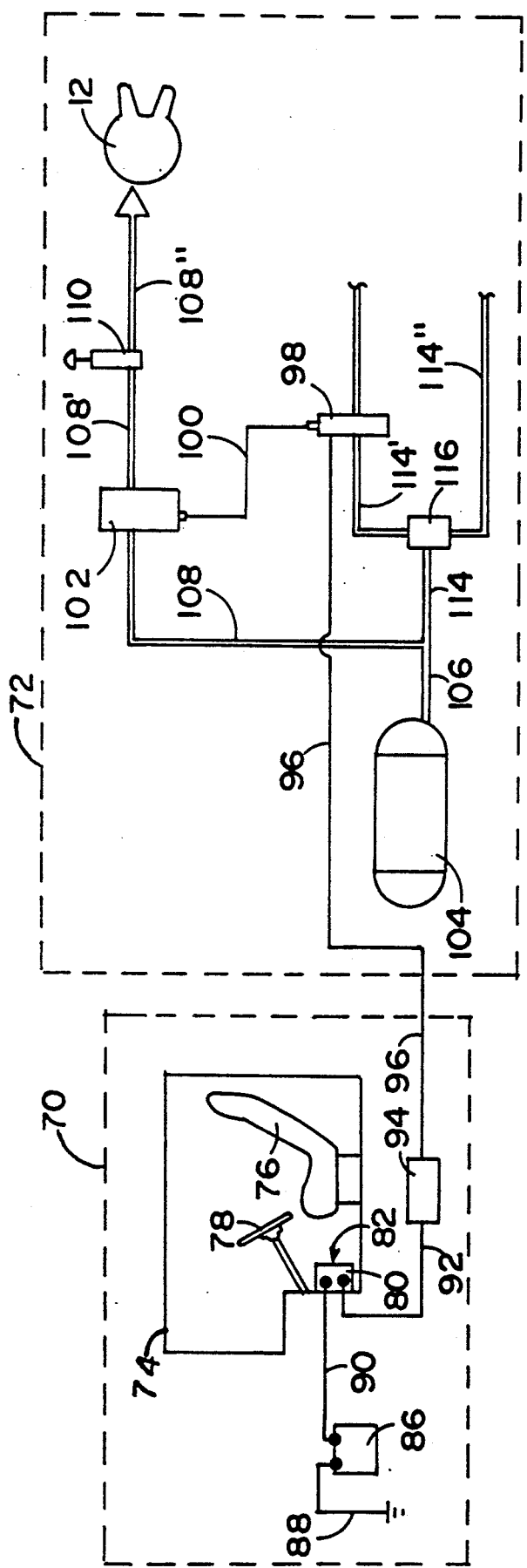
FIG. 1 is a schematic, partially diagrammatic view of the novel fifth wheel hitch system.

The terms forward, rearward and the like, when used herein, have reference to the forward and rearward portions of the wheel when mounted on a truck tractor.

Referring now specifically to the drawings, the fifth wheel assembly 10 includes a main fifth wheel plate 12 mounted on a pair of lateral end brackets (not shown) which are secured to the tractor frame (not shown). The general construction of the fifth wheel assembly, including its mounting, may be like that set forth in U.S. Pat. No. 2,982,566 entitled Fifth Wheel, issued May 2, 1961, and U.S Pat. No. 3,640,549 entitled Nonsquirt Fifth Wheel Assembly, issued Feb. 8, 1972, both incorporated herein by reference. That is, the connections between the brackets and plate 12 include coaxial trunnion bearings at 16 like those shown in the above patent, and pivot pins (not shown) that extend through the bearings and through flanges 20a and 20b respectively. The flanges depend from the undersurface of the opposite sides of fifth wheel plate 12. In conventional fashion, the rearward portion of the fifth wheel plate is bifurcated, having a pair of tapered portions 12a and 12b straddling a kingpin-receiving, convergent mouth 22 that leads to the kingpin-receiving and gripping pivotal jaws 24a and 24b. These two jaws are adjacent the blind end of slot or mouth 22, and define a generally cylindrical, kingpin-receiving opening 26 therebetween when closed.

Figure 2:
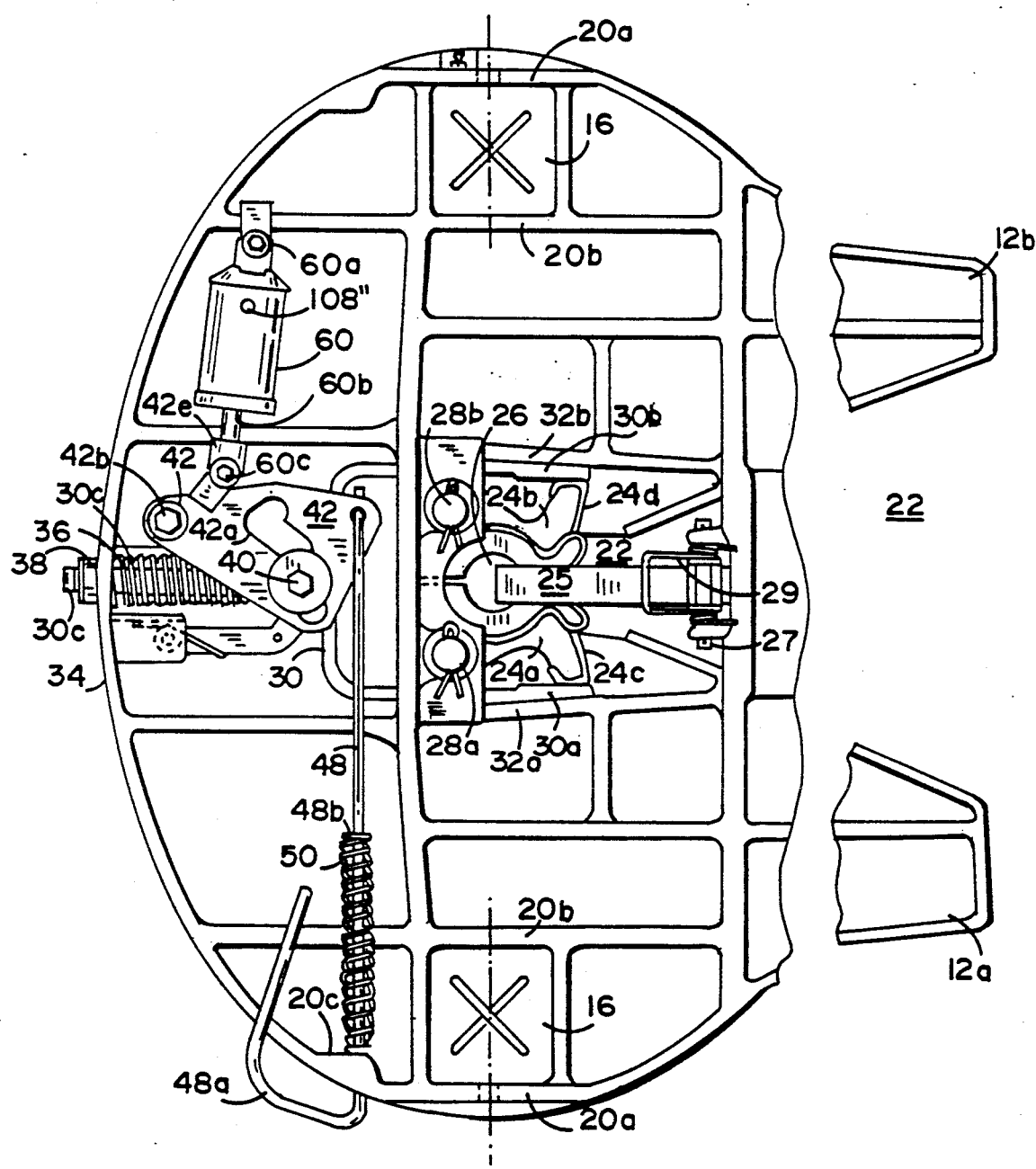
FIG. 2 is a bottom view of a fifth wheel showing components of the system.

Jaws 24a and 24b are pivotally mounted on vertical pivot pins 28a and 28b respectively, to the main plate. Jaws 24a and 24b have oppositely, laterally outwardly protruding ears 24c and 24d respectively, with outer surfaces engageable with the inner surfaces of a pair of parallel legs 30a and 30b of a U-shaped yoke 30. Yoke 30 opens to the rear, is slidable between a forward release position and the rearward jaw locking position depicted in FIG. 2. It is laterally restrained during these movements by a pair of depending integral flanges 32a and 32b of main plate 12. These flanges extend generally rearwardly, and converge slightly toward the rear end of the fifth wheel, to assure engagement of the terminal end portions of yoke legs 30a and 30b with ears 24c and 24d of the jaws, as well as flanges 32a and 32b. Forming part of yoke 30 and extending from the center of the forward cross leg thereof is a shaft 30c which extends forwardly through the arcuate depending flange 34 of main plate 12. A coiled compression spring 36 surrounds shaft 30c, and engages the cross leg of the yoke and flange 34, on opposite ends thereof, to bias the yoke to the rearward, jaw closure locking position illustrated in FIG. 2. Adjustment of the compression spring, and thus of the yoke, is enabled by a threaded connection between the extended threaded end 30c' of shaft 30c and a nut 38 thereon.

Yoke 30 is shiftable between the jaw-securing position (FIG. 2) and the jaw TM releasing condition in a forward linear shift against the bias of compression spring 36, by the cooperation of a cam follower 40 affixed to the center of the cross leg of the yoke, in cooperation with cam track 42a in cam plate 42. Plate 42 is pivotally mounted at 42b on a vertical pin secured to plate 12. Cam track 42a has a curvilinear configuration which has one end of greater radial distance from pivot 42b than the other end such that, with shifting of the cam in a clockwise direction (as viewed from the bottom of the fifth wheel), cam follower 40 will be forced forwardly relative to the fifth wheel, to thereby pull, i.e., retract, yoke 30 forwardly out of engagement with ears 24c and 24d of jaws 24a and 24b. If desired, a conventional safety stop block 25 pivotally mounted on transverse pin 27 extends between the jaws to be depressed from between the jaws against the bias of spring 29 by an entering depending kingpin at the proper elevation. If the kingpin is too high for a good coupling to occur, stop block 25 will not be depressed so the jaws cannot close, all as explained in the above cited prior patents. A conventional hitch releasing pull rod 48 has its inner end pivotally engaged with cam plate 42 as in U.S. Pat. No. 2,982,566. This rod extends laterally, i e , transversely to the longitudinal axis of the fifth wheel and of the trailer coupled to the fifth wheel, through flanges 20a and 20b, to be accessible from the side of the trailer as an override measure. The rod has a typical hand grip loop handle 48a on the outer end thereof. A compression spring 50 encircles rod 48 and is restrained between a stop 48b affixed to the center of rod 48 on one end and outer edge 20c of the main plate on the other end. This compression spring biases rod 48 to the inward nonrelease position. If desired, the pull rod 48 may be attached to a trigger link on cam plate 42 as disclosed in U.S. Pat. No. 3,640,549.

Optional manual release of the hitch mechanism thus can be achieved by pulling on handle 48a of rod 48, to compress spring 50, rotate cam plate 42, causing cam follower 40 to move forwardly, i.e., toward flange 34, thereby shifting yoke mechanism 30 forwardly. This compresses spring 36 and allows jaws 24a and 24b to pivot in opposite directions about their pivot pins. This enables release of the kingpin (not shown) from receiving socket 26.

However, this manual release of the hitch mechanism requires reaching under the trailer, involves a considerable pull force to be applied to the release handle, and is particularly troublesome to a driver who is not large of stature and strong. Further, if extra wide trailers are employed, it is difficult to reach the release handle without at least partially crouching beneath the trailer. In such a posture, it is difficult to apply any considerable force to the handle. In some trailer arrangements, it is almost impossible to eve reach the handle.

The apparatus employs a one-way, fluid power cylinder 60 having one end pivotally attached at 60a to fixed web 20b of plate 12. The cylinder contains a piston (not shown) with an attached piston rod 60b extending from the other end of the cylinder in conventional fashion, the outer end of this rod being pivotally attached at 60c to a fixed link 42e of plate 42. Extension of the fluid cylinder thus pivots plate 42 about pivot axis 42b in the same manner as pulling on release 48.

The present invention enables power release of the fifth wheel hitch to be safely provided on a highway truck tractor trailer assembly. Referring to the embodiment in FIG. 1, the area 70 depicted diagrammatically represents the forward part of the truck tractor while the area 72 represents the rear part of the truck tractor. Forward part 70 includes the cab enclosure 74 for the driver, which in turn includes seating 76, steering assembly 78, and an electrical control 80 having a switch 82 actuable by the driver while in the cab. Elsewhere in the truck tractor is a power source 86, normally a battery, having one electrically conductive lead 88 to ground, e.g., to the tractor frame, and the other electric lead 90 connected to control 80. Extending from switch 82 is a lead 92 connected to a timer 94, the outlet line 96 from the timer connected to a pressure sensor 98 at the rear 72 of the tractor. The outlet lead 100 from sensor 98 extends to a solenoid valve 102. Also at the rear of the tractor is a pressurized air reservoir 104 of conventional type maintained by a compressor (not shown). An air conduit 106 extends from this reservoir and branches into conduit 108 to solenoid valve 102, which is communicative with conduit 108' between solenoid valve 102 and palm button valve 110. Conduit 108 communicates through this valve 110 to conduit segment 108" to fluid cylinder 60 (FIG. 2) at the fifth wheel 12. The other branch 114 of conduit 106 extends to an emergency relay 116 where the conduit branches into conduit 114' to pressure sensor 98 and thence to the emergency or parking brakes of the trailer (not shown), and conduit 114" to the service line for the trailer brakes. Conventional emergency or parking trailer brakes operate on the principle that the brakes are released when the emergency line is under pressure. Loss of pressure results in application of the brakes to the trailer wheels. This occurs, for example, when the trailer is standing by itself not connected to a truck tractor. Pressure sensor 98, if activated by the first actuator, allows the electrically actuated valve 102 to operate and open line 108 to line 108' only in the absence of pressure in line 114'. Thus, the trailer can only be disconnected if the brakes are set, holding it firmly in position to prevent accidental rolling of the trailer after disconnection of the tractor.

When electrical switch 82 is activated by a driver in the cab, this actuates timer 94 which sets a predetermined time period, e.g., 30 seconds, during which the electrically actuated valve 102 can open to compressed air line 108. If the trailer brakes have been set so that there is no pressure in line 114', activated sensor 98 will electrically signal pneumatic valve 102 to open, enabling pressurized air to flow into line 108' to palm valve 110. If the driver dismounts from the cab and, standing on the ground outside of the tractor manually actuates the palm button to palm valve 110, pressurized air will flow through line 108" to cylinder 60 to actuate release cylinder 60 on the fifth wheel hitch and shift cam plate 42 and thereby the cam follower 40. Yoke 30 is shifted forwardly thereby, to release jaws 24a and 24b of the fifth wheel hitch, and thereby release the kingpin. Accidental shifting of switch 82, as by the driver reaching for his coffee cup, will not release the trailer since the second step in the series, i.e., pressing the exterior palm button behind the cab of the tractor, will not occur. Likewise, accidental or purposeful shifting of the palm button in a stationary truck by someone outside of the truck tractor will not allow release of the fifth wheel hitch since in-cab actuator 82 has not been shifted. Only the successive actuation of the inside-of-the-cab switch 82 and then the outside-of-the-cab actuator 110 within the predetermined time period will enable the fifth wheel hitch to be released, and then only if there is an absence of pressure in the emergency brake line to the trailer. The driver then drives the tractor free of the stationary trailer. After the time period expires, the in-cab actuator returns to its original position, shutting off air to conduit 108'. Palm button 110 spring returns to its original position.

When the tractor is next coupled to a kingpin on another trailer, the kingpin entering mouth 22 abuts the rear of jaws 24a and 24b to pivot them shut, allowing spring 36 to push yoke 30 rearwardly and lock the jaws shut. The cam plate 42 pivots and shifts cylinder 60 back to its contracted condition.

Figure 3:
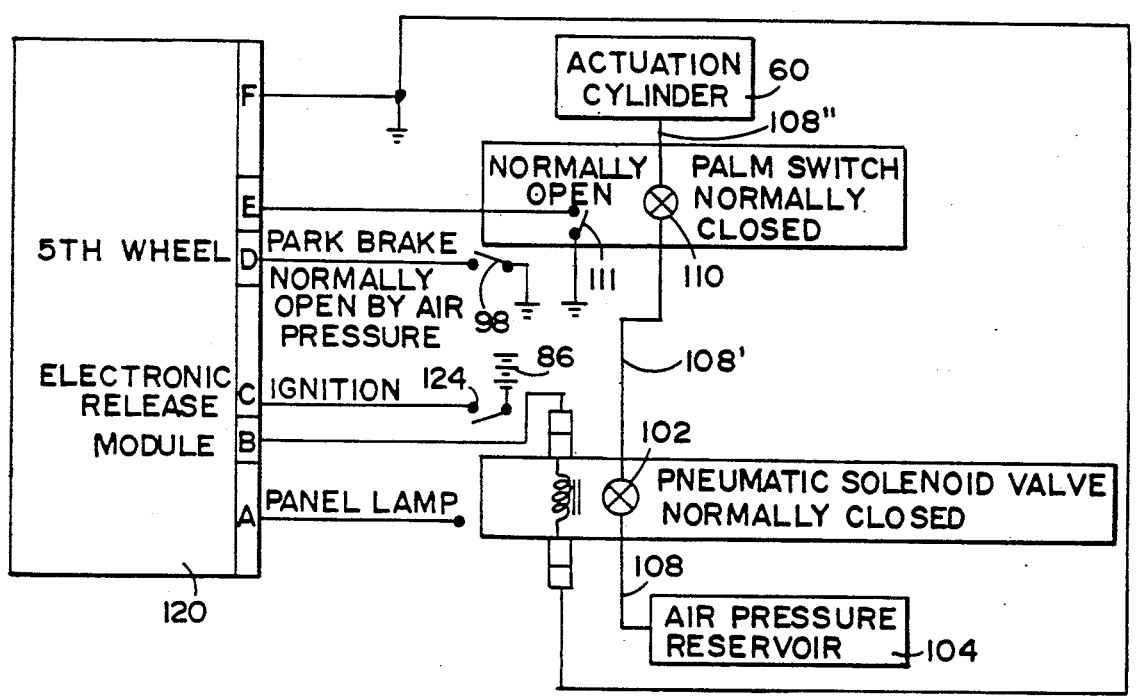
FIG. 3 is a schematic view of an alternative control system for the invention.

In FIG. 3 is set forth another version of the control circuitry for the fifth wheel cylinder. In the embodiments in the different figures, like numerals refer to like parts. In this diagram of FIG. 3, there is an electronic release module microprocessor 120 connected to a power source shown as a battery 86 and activated only with closure of the ignition switch 124. In this instance, as in FIG. 1, the pressure responsive switch 98 is closed by absence of air pressure in the parking brake line/emergency line 114', being normally open in the presence of air pressure. Actuation cylinder 60 is shown diagrammatically, such being connected by air line 108" through normally closed palm switch 110 to the supply line 108', which in turn is connected through the normally closed solenoid valve 102 to air line 108 from air pressure reservoir 104. In this embodiment of FIG. 3, the service line 114" to the brakes, etc. is not depicted.

The operation of the assembly is readily apparent from the description set forth above. The apparatus supplies a safe power actuated fifth wheel release mechanism for a truck trailer combination. Briefly, release of the hitch is achieved by setting the parking brakes so that pressure sensor switch 98 is shifted from normally open to closed position, actuating switch actuator 82 in the truck cab by the driver to activate timer 94 for a predetermined time period, the driver then dismounting from the truck and walking to the rear of the truck tractor and actuating palm button switch 110. When palm switch 110 is closed, switch 111 closes to feed back input to the microprocessor for resetting. In the interim, the timer opens solenoid valve 102 for the specific preset time duration. Hence, air pressure will then be allowed to actuate cylinder 60 of the fifth wheel hitch to pivot cam plate 42 and thereby release the safety yoke and allow the jaws to pivot. The driver then climbs back into the cab, and drives forwardly to allow the kingpin to release from the jaws and disconnect the trailer from the tractor.

If the driver is confused as to how to release the trailer, he can do so manually by utilizing the prior known technique of pulling on release handle 48a. This manual system can also be used if the power system fails for some reason.

Again, closure of jaws 24a and 24b occurs in conventional fashion with introduction of a kingpin through the receiving mouth 22 and into engagement with the back edges of the semicircular portion inside the jaws, pivoting them to their closed position, at which time the jaws are swung together, and spring 36 shifts yoke 30 astraddle of the jaw ears and into a tight binding engagement therewith. This rotates cam plate 42 in the counterclockwise direction as viewed from the bottom of the fifth wheel and pushes cylinder 60 to contracted position.

Conceivably, various details of the novel apparatus may be modified to suit a particular type of installation. The preferred embodiment disclosed herein is to accommodate most of the truck trailers presently in use in commerce. However, there may be special circumstances requiring variations of the preferred system disclosed, such variations intended to be encompassed within the scope of the claims and the equivalent structures to those defined therein.

The embodiments of the invention in which an exclusive property or privilege is claimed are defined as follows.

1. A fifth wheel hitch and control comprising:
jaw means movable between a release position for releasing a king pin, and a closed position for securing the king pin;
jaw releasing power actuator means operably associated with said jaw means for shifting said jaw means from closed position to release position;
a power source to operate said power actuator means;
series actuator control means operably between said power source and said power actuator means comprising a cab interior first partial actuator control operable by the driver in the cab to cause only partial actuation from said power source to said power actuator means, and a cab exterior second partial actuator control operable by the driver outside of the cab to cause only partial actuation from said power source to said power actuator means, said first partial actuator control being in series with said second partial actuator control, requiring both to be operated, inside and outside of the cab respectively, to operably associate said power source with said power actuator to thereby release said jaw means.

2. The fifth wheel hitch in claim 1 wherein said actuator control means includes timer means activated by operation of said first partial actuator control and operably associated with said second partial actuator control for setting a time period following actuation of said first partial actuator control, only during which time period said second control is operable to cause said partial actuation.

3. The fifth wheel hitch in claim 2 wherein said series actuator control means includes a trailer brake line sensor operable to detect the actuation condition of the trailer brakes and to prevent actuation of said jaw releasing power actuator means when the trailer brakes are not set.

4. The fifth wheel hitch in claim 2 wherein said jaw opening power actuator means is operated by compressed air;
said first partial actuator control comprises an electrically operated, first air flow control valve; and
said second partial actuator control comprises a second air flow control valve in series with said first valve to require both said valves to be opened for said power source to operate said power actuator.

5. The fifth wheel hitch in claim 4 wherein said series actuator control means includes a trailer brake line air pressure sensor operable to detect a pressurized, brake released condition or a nonpressurized brake applied condition in the trailer brake line and operable to prevent actuation of said jaw opening actuator means when the presence of a pressurized condition is sensed.

6. The fifth wheel hitch in claim 5 wherein said first partial actuator control is electrically operated, and said sensor is electrically connected within said series actuator control means.

7. A fifth wheel hitch and control comprising:
 jaw means movable between a release position for releasing a king pin, and a closed position for securing the king pin;
 jaw releasing, fluid pressure power actuator means operably associated with said jaw means for shifting said jaw means from closed position to release position;
 a pressurized source to operate said power actuator means;
 series actuator control means operably between said power source and said power actuator means comprising a cab interior first partial actuator control operable by the driver in the cab to cause only partial actuation from said source to said power actuator means, and a cab exterior second partial actuator control operable by the driver outside of the cab to cause only partial actuation from said source to said power actuator means, said first partial actuator control being in series with said second partial actuator control, requiring both to be operated, inside and outside of the cab respectively, to operably associate said source with said power actuator to thereby release said jaw means; and
 said actuator control means including timer means activated by operation of said first partial actuator control and operably associated with said second partial actuator control for setting a time period following actuation of said first partial actuator control, during which time period said second control is operable to operate said power actuator means.

8. The fifth wheel hitch in claim 7 wherein said series actuator control means includes a trailer brake line pressure sensor operable to detect the actuation condition of the trailer brakes and to prevent actuation of said jaw releasing power actuator means when the trailer brakes are not set.

9. The fifth wheel hitch in claim 7 wherein said jaw opening power actuator means is operated by compressed air;
 said first partial actuator control comprises an electrically operated, first air flow control valve; and
 said second partial actuator control comprises a second air flow control valve in series with said first valve to require both said valves to be opened for said power source to operate said power actuator.

10. The fifth wheel hitch in claim 9 wherein said series actuator control means includes a trailer brake line air pressure sensor operable to detect a pressurized, brake released condition or a nonpressurized brake applied condition in the trailer brake line and operable to prevent actuation of said jaw opening actuator means when the presence of a pressurized condition is sensed.

11. The fifth wheel hitch in claim 10 wherein said first partial actuator control is a manually actuated, electrically operated air control valve, and said second partial actuator control is a manually operated air control valve.

12. The fifth wheel hitch in claim 11 wherein said sensor is electrically connected within said first partial actuator control.

* * * * *